US005403053A

United States Patent [19]

Zareck

[11] Patent Number: 5,403,053

[45] Date of Patent: Apr. 4, 1995

[54] CAN OPENING AND LIQUID EXPELLING APPARATUS

[76] Inventor: Mark A. Zareck, 3014 S. Olathe Way, Aurora, Colo. 80013

[21] Appl. No.: 176,839

[22] Filed: Jan. 3, 1994

[51] Int. Cl.[6] .............................................. A47J 45/07

[52] U.S. Cl. .................................... 294/16; 294/27.1; 210/514; 30/410

[58] Field of Search ........................ 30/410, 436, 442; 210/464, 514; 294/27.1, 16

[56] References Cited

U.S. PATENT DOCUMENTS

| | | | |
|---|---|---|---|
| 563,136 | 6/1896 | Caswell | 210/464 |
| 731,034 | 6/1903 | Fretwell | 30/436 |
| 1,269,277 | 6/1918 | Hartman | 30/410 |
| 1,523,772 | 1/1925 | Hargraves | 30/436 |
| 1,536,070 | 5/1925 | Brught | 30/436 |
| 1,618,457 | 12/1927 | McGrath | 30/436 |
| 2,437,234 | 3/1948 | Webb | 30/410 |
| 3,059,954 | 10/1962 | Matejicek | 294/16 |
| 3,203,598 | 8/1965 | Alford | 294/27.1 |
| 3,898,898 | 8/1975 | Peres | 30/410 |
| 3,995,544 | 12/1976 | Farley | 100/116 |
| 4,355,574 | 10/1982 | Bond et al. | 100/234 |
| 4,860,647 | 8/1989 | Kerslake | 100/234 |
| 5,272,969 | 12/1993 | McDonald | 294/16 |

*Primary Examiner*—Kenneth E. Peterson

[57] ABSTRACT

A device for detaching the top of the can and draining the fluid contained therein. In the first embodiment, an upper and lower handle are adjustable in relation to one another to account for different can sizes. A conventional can opener is attached to a plunger that includes a magnet. A can is placed on a lower, can bottom engaging member, and the can opener is operated to detach the top of the can. The plunger can then be pressed downwardly, with the can being securely held by the device, and the liquid contained therein is thus expelled. In the second embodiment, The handle is a single, substantially vertical member. Integral to it is a can bottom engaging member. The can is placed on the member, and then a can lip engaging member and a plunger, also including a magnet, are manipulated to hold the can in place. The otherwise conventional can opener is used to open the can and the plunger can be manipulated, as before, to expel the liquid from the can. In both embodiments, the magnet on the end of the plunger allows the user to easily remove the detached top when the operation is completed.

4 Claims, 3 Drawing Sheets

CAN OPENING AND LIQUID EXPELLING APPARATUS

BACKGROUND OF THE INVENTION

1. Field of the Invention

The present invention relates to household utensils. More specifically, it relates to an apparatus for opening a can and draining fluid retained therein. Even more specifically, it relates to a device with a handle, a can bottom engaging means, and a conventional can opener attached to the upper portion of the handle, allowing the user to place a can into the device, detach the top of the can with the can opener, and then drain the liquid retained in the can by tilting the entire apparatus and without removing the can from the device.

The invention could also find use as a general purpose tool for remotely manipulating any metallic object within a blind hole. As such the potential fields of use are myriad. Those skillful in the mechanical arts will find many other potential fields of use for this device. It is to be understood from the outset that the scope of this invention is not limited to these fields or to the specific examples of potential uses presented hereinafter.

2. Description of the Prior Art

Many edibles are packed in cans for long-term storage purposes. The edibles are packed in liquid of some sort during the canning process. A problem that exists, especially in the case of strong smelling foodstuffs, such as various types of fish products, is that before use, the user has to drain the liquid from the can. During this process, the liquid, which over time will have incorporated the smell of the packaged foodstuff, can get onto the user's hand, or perhaps be spilled onto an article of clothing. The present invention serves to obviate this problem, however first the discussion turns to previous patents that have addressed similar concerns.

First is U.S. Pat. No. 2,708,401 issued to Armand J. Leclerc et al. on May 17, 1955. This discloses a device for squeezing tea bags wherein a pair of arms are each provided with an enlarged finger hold for opening after the squeezing operation. One of the arms has a perforated paddle or plate and the other is provided with a concave receptacle. By contrast, the present invention does not require the perforated paddle or plate because it utilizes the detached can lid for the same purpose. Also, the concave receptacle is not required as my invention uses the existing can for the same purpose.

In U.S. Pat. No. 3,995,544 issued to D. Gray Farley on Dec. 7, 1976 there is disclosed a device with a generally cup-shaped member having cylindrical side walls and an integral circular end wall with a plurality of apertures. An opened can is inverted over the cup and pressed downward to evacuate the fluid. By contrast, the instant invention does not require inversion of the can. Also, Farley does not disclose a means to multiply the imposed squeezing force as is done by the lever system of my invention.

Next is U.S. Pat. No. 4,355,574 issued on Oct. 26, 1982 to James M. Bond et al. In this device, we see a pair of scissor like elongated arms coupled by a pivot member. One end of each of the arms ends in a handle portion and the other ends form loop type jaw formations. Attached to the loop type formation of the upper arm is a flat, circular, thin platen adapted to enter the food product. It is attached to the loop type formation by an upwardly opening channel type spring. By contrast, the instant invention does not require the circular platen because is utilizes the detached can lid for the same purpose. Also, the improved geometry of my hinged arms allows a much greater squeezing force to be obtained with less effort.

Lastly, U.S. Pat. No. 4,860,647 issued on Aug. 29, 1989 to James L. Kerslake discloses a device having handles pivotally connected at a pivot pin with an upwardly facing can holding plate. There is a plunger depending downwardly from the upper handle that has an angled downwardly facing pressure plate. The plate is seen to have a magnet for retracting the detached can lid from its depressed position within the can. Kerslake's lever pivot point is outside the applied and resistive forces. By contrast, the instant invention uses a lever system with the pivot point between the applied and resistive forces. The subtle, but important, difference is that my invention only requires access to one side of the can.

None of the above inventions and patents, taken either singly or in combination, is seen to describe the instant invention as claimed.

SUMMARY OF THE INVENTION

The present invention is a device for detaching the top of the can and draining the fluid contained therein. In the first embodiment, an upper and lower handle are adjustable in relation to one another to account for different can sizes. A conventional can opener is attached to a plunger that includes a magnet. A can is placed on a lower can-bottom engaging member, and the can opener is operated to detach the top of the can. The plunger can then be pressed downwardly, with the can being securely held by the device, and the liquid contained therein is thus expelled. In the second embodiment, The handle is a single, substantially vertical member. Integral to it is a can bottom engaging member. The can is placed on the member, and then a can lip engaging member and a plunger, also including a magnet, are manipulated to hold the can in place. The otherwise conventional can opener is used to open the can and the plunger can be manipulated, as before, to expel the liquid from the can. In both embodiments, the magnet on the end of the plunger allows the user to easily remove the detached top when the operation is completed.

Accordingly, it is a principal object of the invention to provide a can opening and draining accessory wherein the liquid contained in the can is easily drained without soiling the hands of the user.

It is another object of the invention to ensure that the can is securely gripped by the device so that accidental spillage does not occur.

Another object of the invention to provide a can opening and draining accessory requiring no drain receptacle other than the original can.

Another object of the invention to provide a can opening and draining accessory requiring no can entering piston plunger other than the original can lid.

Another object of the invention to provide a can opening and draining accessory which is easily adaptable to cans of various sizes and shapes.

Another object of the invention to provide a can opening and draining accessory which will magnify the force applied by the user to easily generate a large squeezing force.

It is another object of the invention to provide a can opening and draining accessory that includes a magnet on the plunger so that the detached top of the can is easily removed by the user after the liquid is drained.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
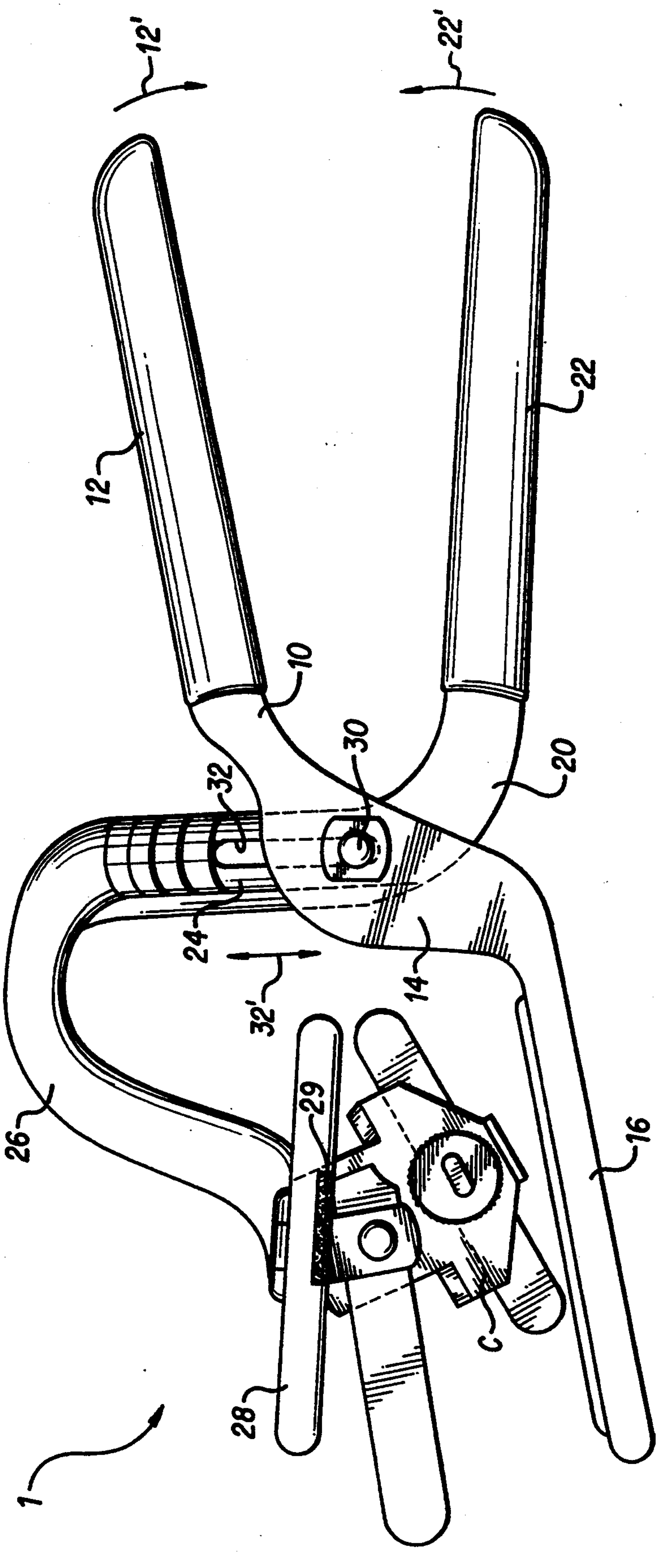
FIG. 1 is an environmental perspective view of the first embodiment of the invention.

The first embodiment of the present invention is shown in FIG. 1 and is indicated generally as 1. This embodiment has a top handle portion 10 and a bottom handle portion 20. They are connected to one another at an adjustable pivot point 30. This pivot point 30 is adjustable along slot 32 to provide for differently sized cans in much the same manner as a conventional pair of vise grip pliers. The top handle portion 10 consists of a top grip portion 12, a substantially thicker pivot point engagement portion 14, and a can bottom engaging portion 16. The bottom handle portion 20 consists of a bottom grip portion 22, a slotted portion 24, a curved neck portion 26, for allowing the plunger to travel, thus enabling it to expel the liquid from the opened can, and the plunger 28. Attached to the plunger 28 is a magnet 29, that allows the detached can top to be easily removed after the liquid is expelled from the can. Optionally attached to the plunger 28 is an otherwise conventional can opener C. The operation of these can opening devices is well known and need not be discussed further. It should be noted that the top and bottom grip portions 12, 22 are shown herein as substantially oval loops made of a stock material. Other shapes would occur to anyone skilled in the art, the object of the grip portion 12, 22 being to fit comfortably in the user's hand and to keep manufacturing costs to a minimum.

In regard to the material used, any number of metal alloys would be satisfactory. Stainless steel would be a good choice in a commercial setting for ease of cleaning. Other metal alloys, or perhaps even a high grade plastic or wood, would be suitable for non-commercial home use.

In use, a can containing a liquid/solid mixture is placed on the can bottom engaging portion 16. Then the top and bottom handle portions 10, 20 are manipulated in relation to one another in the directions shown by arrow 32' such that the plunger 28 will rest generally parallel to the can top (not shown). The top and bottom grip portions are then manipulated as shown by the arrows 12' and 22', bringing the plunger 28 into firm contact with the can. The can opener C is utilized to detach the top of the can (not shown) from the rest, and then, by further manipulating the top and bottom grip portions 12, 22 as shown by the arrows 12' and 22' and tilting the opened can appropriately, the liquid can be expelled without the likelihood of it soiling the user's hands or clothing. It should be understood that the arrangement shown herein has the slot 32 on the bottom handle portion 20, the slot 32 could easily be placed on the top handle portion 10.

After the liquid in the can has been suitably drained, the top and bottom grip portions are pulled apart (opposite arrows 12' and 22') and the magnet 29 will lift the detached lid from the can for easy removal.

Note the user applied forces (on grip portions 12 and 22) are on one side of pivot 30 while the resistive forces (on plunger 28 and can bottom engaging portion 16) are on the other side of pivot 30. With this arrangement, the entire device requires access to only one side of the can being manipulated. This being the case, it is practical to make grip portions 12 and 22 very long and to apply the user forces a substantially further distance from the pivot than the distance from the pivot to the resistive forces generated by the can engaging members 16 and 28. The ratio of these distances is a measure of the amount the user applied force is multiplied. For example, if the grip distance is twice the can distance (approximately as shown in FIG. 1) a gripping force of 50 pounds would generate a compressive force of 100 pounds on the can contents.

A list of reference numerals for the first embodiment of the present invention follows:

| | |
|---|---|
| top handle portion | 10 |
| bottom handle portion | 20 |
| adjustable pivot point | 30 |
| pivot point slot | 32 |
| top grip portion | 12 |
| pivot engagement portion | 14 |
| can bottom engaging portion | 16 |
| bottom grip portion | 22 |
| slotted portion | 24 |
| curved neck portion | 26 |
| plunger | 28 |
| magnet | 29 |
| conventional can opener | C |

Figure 2:
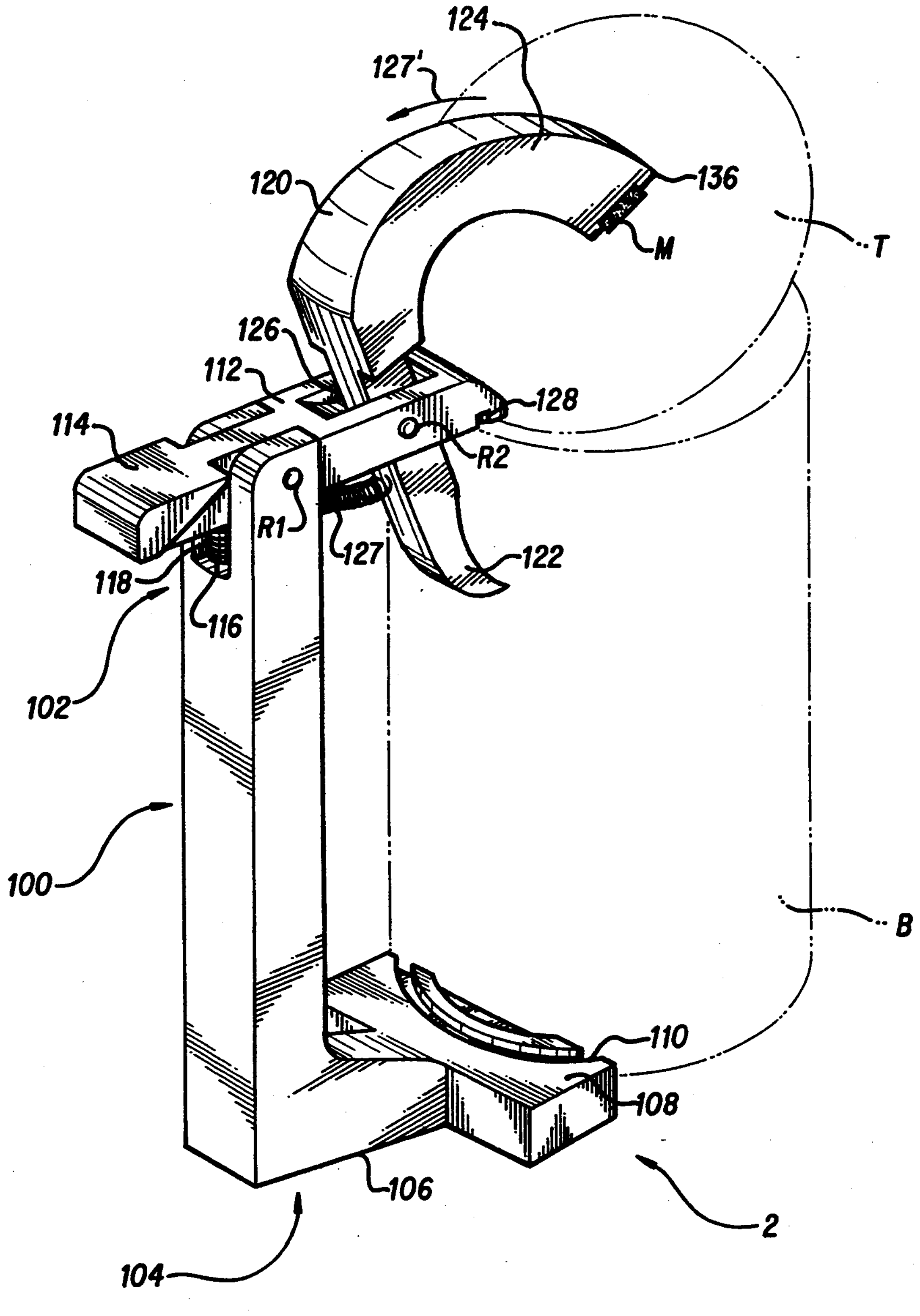
FIG. 2 is an environmental view of the second embodiment of the present invention.

The second embodiment of the present invention is shown in FIGS. 2–6 and in FIG. 2 is indicated generally as 2. In this embodiment, the handle 100 is a substantially vertical member with a top portion 102 and a bottom portion 104. The bottom portion 104 further includes a substantially planar bottom rest surface 106 that allows the device 2 to be placed on a kitchen counter, table, or the like without the likelihood of it falling over. Bottom portion 104 also includes a can bottom engaging member 108 that further includes a partially arcuate groove 110 for engaging the curved can B lower lip (not shown).

The top portion 102 includes a can lip engaging member 112 that has a thumb rest 114. The can lip engaging member 112 fits in a top engagement member slot 116 and engagement member 112 is biased clockwise about pivot R1 by a first spring 118. A plunger and trigger member 120 includes a trigger portion 122 and a plunger portion 124. This trigger and plunger member 120 fits within an aperture 126 within the can lip engaging member 112. Additionally, the plunger and trigger member is biased by a second spring 127 such that the plunger tends to move in the direction indicated by arrow 127'. The can top engaging member 112 also has a can top engaging groove 128 disposed at the end opposite the thumb rest 114.

The can top engagement member 112 pivots about a first rivet R1 in relation to the handle 100 and the trigger and plunger member 120 pivots in relation to the can top engagement member 112 about a second rivet R2. The plunger portion 124 engages the can top T by means of the magnet M disposed on its end 130. A conventional can opener C is optionally accommodated on the can lip engaging member 112 proximate the groove 128 and the can opener C is arranged such that it can easily open the can B as will be discussed hereinafter.

In use, the can B is first placed in groove 128, which, by means of first spring 118 is biased downwardly to resist this engaging movement. The bottom lip (not shown) of the can B is then placed in the partially arcuate groove 110. Thus, the can is held firmly in place within the device 2. The conventional can opener C is then used to open the can B in the normal fashion. The user engages the trigger portion 122 of the member 120 and brings the magnet M in contact with the can top T. Pulling back on the trigger 122 presses the plunger 124 such that the can B may be tilted and the liquid contained therein expelled without the likelihood of soiling the user's person or clothing. When the trigger 122 is released, second spring 127 biases the plunger 124 in the direction indicated by arrow 127' and the can top T can be easily and safely removed from the main body of the can B.

The artisan will recognize that rivets R1 and R2 are only exemplary and that any suitable means of achieving the described pivoting action of the various arms could be employed. It also should be noted that the upright standard portion of handle 100 could be made telescopic so as to accommodate a wide range of can dimensions.

Figure 3:
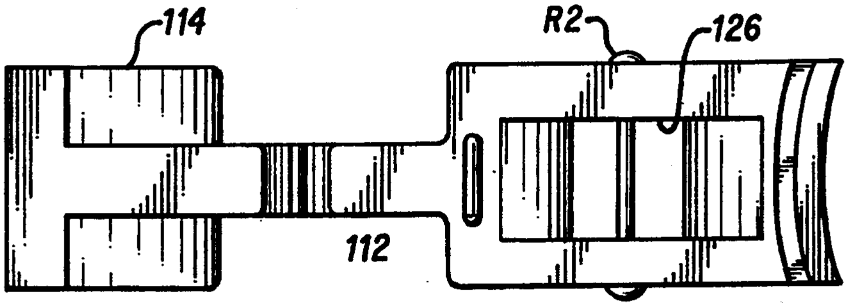
FIG. 3 is a bottom view of the can lip and thumb engaging member of the second embodiment.
Figure 4:
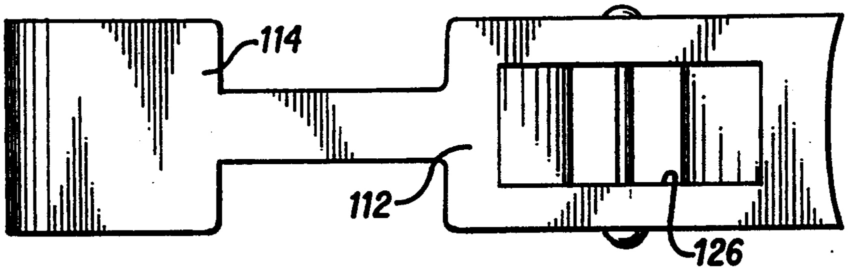
FIG. 4 is a top view of the can lip engaging member.
Figure 5:
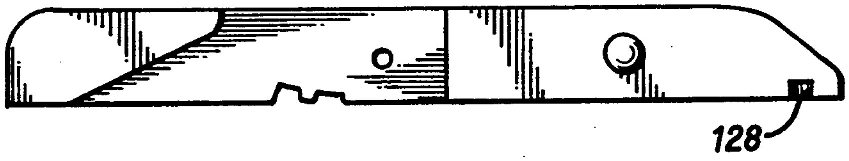
FIG. 5 is a side view of the can lip engaging member.

FIGS. 3-5 illustrate, from different viewpoints, constructional details of the can lip engaging member 112 when removed from the rest of the assembly. The operation of the can lip engaging member 112 will be clear from the previous description of FIG. 2.

Figure 6:
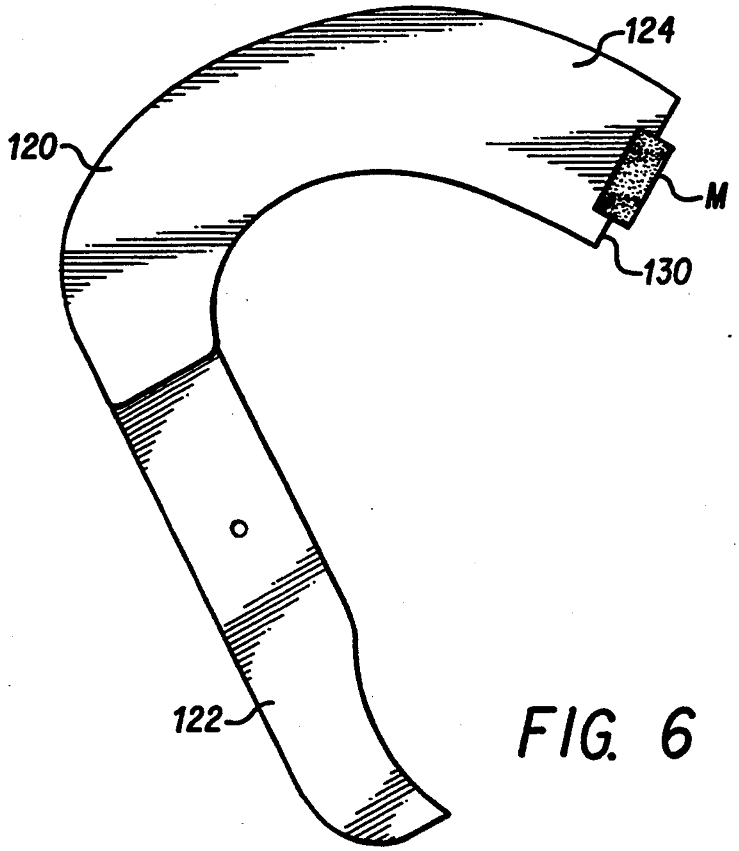
FIG. 6 is a side view of the plunger and trigger member of the second embodiment of the invention.

FIG. 6 illustrates the plunger and trigger member 120 as it would appear from the side if removed from the previously described assembly. It is significant to note the inset of magnet M into plunger portion end 130. With this arrangement only the magnet contacts the can lid, thus providing a strong attachment for removing a lid if it should become wedged in the can.

A reference numeral list for the second embodiment of the present invention follows:

| | |
|---|---|
| handle | 100 |
| handle top portion | 102 |
| handle bottom portion | 104 |
| bottom rest surface | 106 |
| can bottom engaging member | 108 |

-continued

| | |
|---|---|
| partially arcuate groove | 110 |
| can lip engaging member | 112 |
| thumb rest | 114 |
| top engagement member slot | 116 |
| first spring | 118 |
| plunger and trigger member | 120 |
| trigger portion | 122 |
| plunger portion | 124 |
| aperture | 126 |
| second spring | 127 |
| can top engaging groove | 128 |
| first rivet | R1 |
| second rivet | R2 |
| plunger portion end | 130 |
| magnet | M |

The artisan will note there is no need for a piston type plunger with either embodiment of this invention, as the severed can lid serves as a piston being driven by the mechanisms herein disclosed. This ensures that the piston (being the can lid) will always precisely fit the can from which it was removed. Therefore the invention will easily accept rectangular or other odd-shaped cans.

It is to be understood that the present invention is not limited to the sole embodiments described above, but encompasses any and all embodiments within the scope of the following claims.

I claim:

1. A device for removing liquid contained within a can, said device comprising:
   - a handle having a top portion and a bottom portion;
   - a can bottom engaging member proximate said bottom portion;
   - said handle top portion includes an adjustable plunger means, said plunger means including a magnet; whereby
   - a user can place a can between said can bottom engaging portion and said adjustable plunger means, said adjustable plunger means is manipulated to hold the opened can firmly in place and expel liquid contained therein, said magnet engages the detached top of the can, and the can is then removed from the device;
   - said handle top further includes a can lip engaging member having a thumb rest and a can top engagement slot, said can lip engaging member being in contact with a biasing means such that said can top engagement slot is firmly urged into engagement with the top peripheral lip of a conventional can.

2. The liquid expelling device as claimed in claim 1 wherein said can bottom engaging portion includes a protruding can bottom engagement member that has disposed therein a partially arcuate groove for receiving the peripheral bottom lip of a conventional can.

3. The liquid expelling device as claimed in claim 1 wherein the plunger means includes a trigger member attached thereto and disposed such that said trigger member is pressed to manipulate said plunger means such that liquid contained in the can is expelled.

4. The liquid expelling device as claimed in claim 2 wherein said trigger member is in contact with a second biasing means such that when said trigger member is released, said plunger is urged upwards and away from the can, carrying the detached top.

* * * * *